Figure 1:
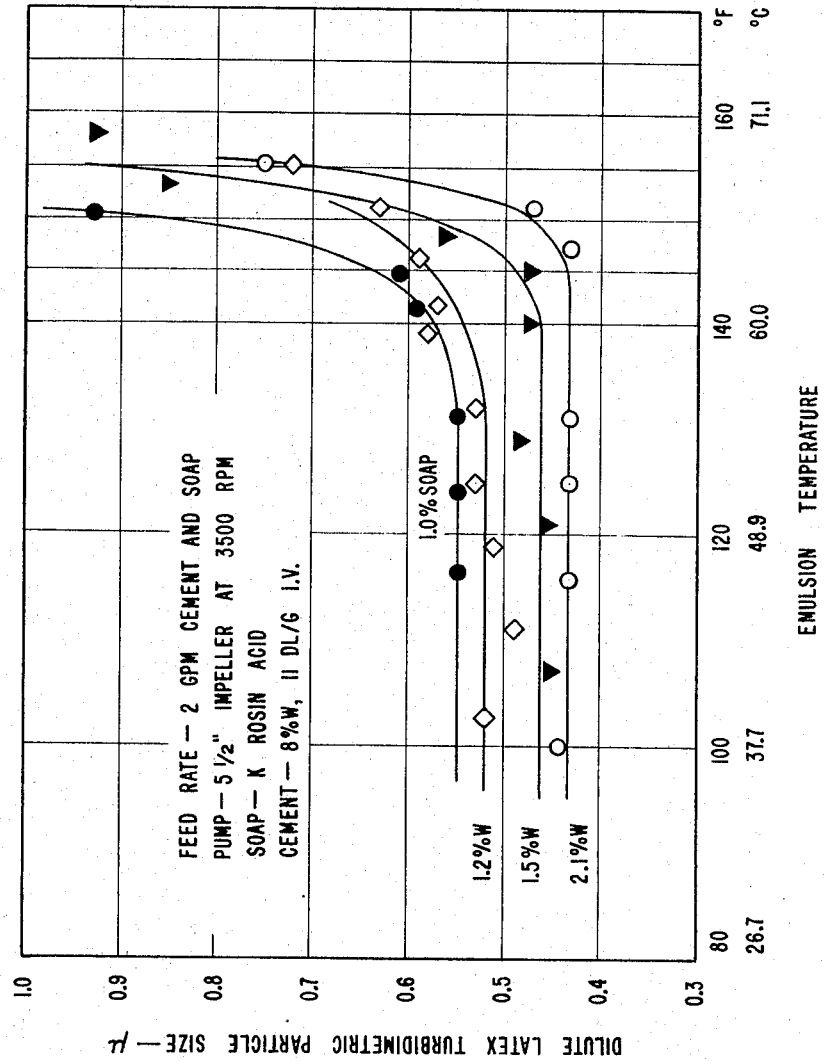

INVENTORS:
WALTER M. HALPER
F. DUDLEY MOSS
BY: *William H. Myers*
THEIR AGENT

United States Patent Office 3,310,515
Patented Mar. 21, 1967

3,310,515
PREPARATION OF LATICES FROM ORGANIC
SOLVENT SOLUTIONS OF ELASTOMERS
Walter M. Halper, San Pedro, and Fred Dudley Moss, Long Beach, Calif., assignors to Shell Oil Company, New York, N.Y., a corporation of Delaware
Filed Jan. 11, 1963, Ser. No. 250,866
4 Claims. (Cl. 260—29.7)

This invention relates to the process for producing latices of synthetic polymers. More particularly, it relates to improved processes for producing latices of elastomers from organic solvent solutions thereof.

Synthetic elastomers and other polymers have been prepared by emulsion polymerization techniques, whereby the resulting product at the end of the polymerization is a colloidal suspension. Thus, for example, synthetic elastomers of the type represented by styrene-butadiene copolymers are suitably prepared by emulsion polymerization in the presence of water and emulsifying agents so that the resulting product is an aqueous suspension of the copolymer together with unreacted monomers.

In such emulsion polymerization processes, the copolymer ultimately may be separated upon the addition of precipitants such as salt and acid, whereupon a crumb of the rubber is obtained which is easily separated from the aqueous phase. Synthetic latex, as distinguished from crumb, is highly useful in the production of foam rubber or cellular productions. The latex usually is obtained from the emulsion by flashing to remove unreacted monomer and some water, the resulting product being latex.

In the usual procedure for the preparation of a latex from polymer solutions the primary objective is to prepare a latex which, although unstable enough to be amenable to gelation to form a continuous sponge or a thin dipped shape, is resistant to coagulum formation in the processing steps of formation, stripping, and concentrating. It has been determined that, other conditions being equal, an increase in the amount of emulsifying agent causes a reduction in the average particle size of the latex particles. This, however, has no primary effect on the latex stability since for a given weight of latex polymer the smaller particles simply demand a higher level of emulsifying agent because the total particle surface is greater. On the other hand, a larger particle size is desired for stability at a given emulsifier level at least up to the point where the latex no longer qualifies as a colloidal suspension. Consequently, the conditions of latex preparation as described hereinafter are concerned with critical interrelated factors surrounding these associated problems.

In recent years, synthetic elastomers produced by solution polymerization methods have received much attention mainly due to advances and changes in elastomer technology. The problems of emulsifying the cements so produced to make latices therefrom have created difficulties not heretofore experienced because material differences exist not only within the elastomers per se but also because the solutions of these elastomers have different rheological properties and characteristics from those of prior products.

Now, in accordance with the present invention, a process is provided for the preparation of latices of synthetic elastomers having the desirable aspect of average particle size within a range necessary for adequate stability and at the same time being suitable for concentration by any of several means. Particularly favored is concentration by centrifuging because by this means a substantial proportion of the emulsifying agent is removed without causing coagulation or massive precipitation of the elastomer. The process in accordance with the invention therefore comprises the emulsification of an elastomer cement within a critically defined temperature range from about 20° C. to about 66° C. and under conditions such that substantially none of the cement solvent is vaporized during emulsification. The emulsion so formed under these critical conditions is thereafter treated to remove the cement solvent thus obtaining a latex of the elastomer in an aqueous medium.

Figure 2:
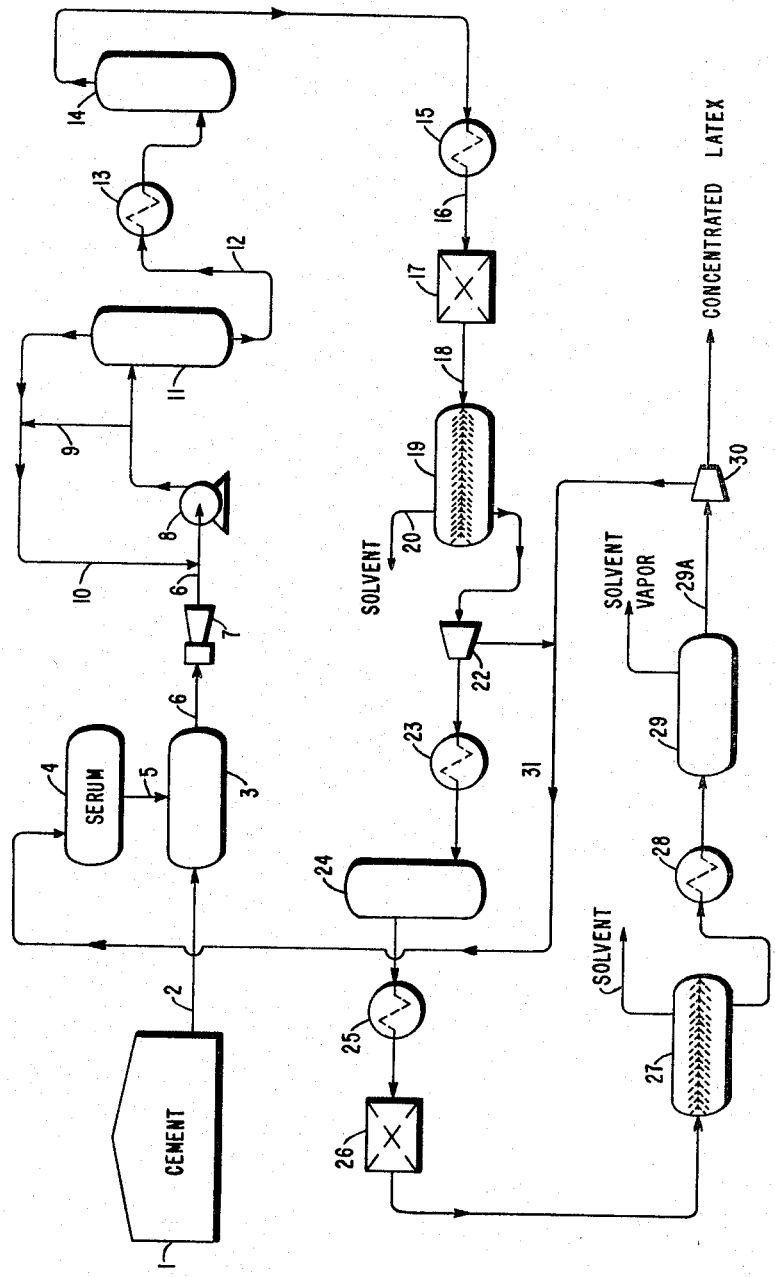

FIGURE 1 forming a part of this specification shows the effect of emulsification temperature upon the particle size of latices eventually prepared from emulsions. FIGURE 2 outlines a preferred set of apparatus for carrying out the entire latex process.

*The polymer*

The process of this invention is applied to any hydrocarbon polymer that is in the form of a cement before being emulsified. It is immaterial how the cement of the polymer is obtained. Preferably the polymer is a synthetic elastomer and still more preferably, a rubbery polymer (including copolymers) of conjugated dienes. The solvent utilized in forming the cement (polymer solution) preferably has a small but measurable solubility in water, e.g, 0.5–5 cc. per liter of water at 20° C. The prefererd class of solvents comprises those boiling at least 40° C. below the boiling point of water under a given set of conditions, i.e., pressure, although the process can be adjusted to accommodate higher boiling solvents such as toluene and cyclohexane. Still more particularly, the solvents considered most suitable for use in the latex forming process of this invention comprise hydrocarbons which are solvents for the rubbers employed and have boiling points below about 60° C. at atmospheric pressure.

In the more preferred embodiments, the process of the invention is applied to synthetic hydrocarbon elastomers prepared by solution polymerization methods wherein an organic diluent is used as a combined solvent and diluent. Butadiene and isoprene are representatives of conjugated dienes which are polymerized by solution polymerization utilizing the so-called "low pressure" polymerization methods wherein the polymerization catalyst may be the reaction product of a halide of a transistion metal within groups 4–8 of the periodic table and a reducing agent such as an aluminum alkyl, aluminum alkyl halide, aluminum halide and the like. Lithium alkyls, alone or in combination with lithium metal are also suitable polymerization catalysts for conjugated dienes. Thus, polybutadiene or polyisoprene having a cis-1,4-content as high as about 95% may be obtained while by other methods polymers having a high trans-1,4-content may be prepared if so desired.

Another class of synthetic polymers comprise the copolymers prepared from ethylene and one or more monoolefins having up to 8 carbon atoms and terpolymers having a diene in a minor proportion. Suitable copolymers include especially the copolymers of ethylene and propylene which may be either elastomeric or plastic depending upon the relative proportions of ethylene and propylene and the copolymers of ethylene with butene-1 and the like. Typical terpolymers prepared by solution polymerization are exemplified by the terpolymer obtained by the combination of ethylene, propylene, and a diene such as 1,5-hexadiene, cyclopentadiene, dicyclopentadiene or cycloheptadiene. This type of elastomer may be prepared by polymerization of a mixture of monomers with a catalyst which may be the reaction product of a reducing agent of the kind indicated above and a vanadium compound such as vanadium halides, vanadium oxyhalides, vanadium esters and the like.

The usual solvents employed for these polymerizations which are suitable for use in the present process include hydrocarbons having from 4 to 9 carbon atoms each and preferably from 4–5 carbon atoms each including butanes, pentanes, hexanes, butylenes, amylenes, cyclohexane, benzene, toluene, halogenated derivatives thereof and other relatively inactive diluents and solvents known in the art.

Persons skilled in the art will understand that the hydrocarbon elastomers comprise those that are of relatively recent origin. The elastomer solutions are characterized by being very high in viscosity even at low elastomeric polymer content. Thus, the solids content of the elastomer solution at the end of the polymerization rarely exceeds 30% by weight and in fact at such concentrations, great material handling problems are presented so that the solutions usually contain in the order of 5–20% by weight of the elastomer.

When the cement is emulsified, the solid content is preferably substantially less than if it is to be processed to form a crumb. The inevntion is not critically limited to elastomers prepared by the low pressure processes and any hydrocarbon elastomers produced by solution processes may also be the subject of the present invention. Alternatively, elastomers that are in solid form may be dissolved or redissolved after preparation by other means. When used within this specification, the term "synthetic elastomer" makes reference to synthetic elastomers defined according to ASTM Special Technical Publication No. 184, page 138, wherein the elastomer is further characterized in being essentially completely soluble in an organic solvent.

The emulsification

The emulsification of the polymer solution comprises bringing together water, an emulsifying agent and the polymer cement. The apparatus employed for emulsification should be designed for the purpose of homogenizing such mixtures for the production of emulsions. In this regard, a centrifugal pump with a variable speed control and/or a bypass is found to be suitable although other homogenizing equipment may be used in place thereof.

It will be found that the maximum throughput rate in a given piece of apparatus may be substantially increased if the concentration of the polymer in the organic solvent is restricted so as to utilize an optimum viscosity which will vary depending upon the particular apparatus and the particular polymer employed. The viscosity is not only dependent upon the concentration of the polymer in its cement but also upon the average molecular weight of the polymer contained therein. Taking as an example, cis-1,4-polyisoprene solution in an aliphatic diluent such as isopentane or isoamylene, suitable throughput rates are experienced at concentrations in the order of 10–20% although much faster throughput rates may be experienced if the concentration is maintained in the order of 7–10% by weight, the intrinsic viscosity of the polymer contained in the cement being between about 4 and 14 dl./g.

The amount of emulsifiying agents and of water emulsified together with the polymer cement depends on such factors as the particular synthetic elastomer being emulsified. The proportion will also vary depending upon the emulsification apparatus, the identity of the emulsifying agent, the concentration of the elastomer solution and other variables including temperature. It should be emphasized that the proportion of emulsifying agent utilized at this point in the process is not necessarily the concentration of emulsifying agent which will remain in the latex eventually produced after the claimed process. Generally, the minimum amount of emulsifying agent needed for emulsification ranges from about 2 to 30 parts per 100 of polymer (phr.), but the amount that is contained in the most preferred concentrated latex is usually much lower than the 30 parts specified above and will vary depending upon the particular elastomeric latex that is being prepared. Amounts from about 1 to about 3 phr. usually are optimum.

Any of the emulsifying agents employed in the emulsion polymerization art may be suitably employed for the purposes of the present invention. Preferably, the emulsifying agents are soaps and particularly alkali metal soaps of monocarboyxlic acids. The sodium or potassium soaps of rosin acids are especially preferred although mixed soaps such as the soaps of tall oil acids, saturated or unsaturated fatty acids such as oleic, palmitic, stearic, lauric, myristic, castor oil acids and similar acids may be employed in the preparation of suitable emulsifying soaps.

In addition to, or in place of, the soap emulsifying agents, other emulsifiers may be utilized including cationic or non-ionic water dispersable emulsifiers, particularly the amine salts of hydroxyl amines and long chain fatty acids esters as well as quaternary ammonium salts such as tridecyl benzene, hydroxy ethyl, imidazoline chloride and stearyl dimethyl benzenyl ammonium chloride and the like. Nonionic surfactants which may be utilized for this purpose are represented by phosphoric acid esters of higher alcohols such as capryl and octyl alcohols, monesters of oleic acid with pentaerythritol sorbitan monooleate and the like.

The emulsifying agent is preferably added to the mixture being prepared for emulsification in the form of an aqueous solution or dispersion and desirably is in concentrations in the order of 0.5 to 2% based on the eventual aqueous phase of the emulsion. The amount of water contained in the total composition for emulsification will normally range from about 30 to about 300 parts per hundred parts by volume of elastomer solution (cement), with amounts in the order of 50–100 being preferable.

It will be readily appreciated that the emulsification procedures may be varied within the knowledge of the art. Thus, the emulsifying agent may be prepared in situ by adding the soap forming acid to the elastomer solution and adding an alkali metal hydroxide to the aqueous phase. The reaction of the alkali metal hydroxide and soap forming acid occurs during emulsification. If desired, all of the ingredients that are to be emulsified may be charged to a single vessel which is under constant agitation and the blend may be continuously fed to an emulsifying apparatus. Alternatively a water solution of emulsifying agent and the elastomer solution may be fed by separate inlets into the emulsifying apparatus in the desired proportions and the resulting aqueous emulsion recovered and stored for subsequent processing.

The proportion of emulsifying agent is adjusted for the purpose of forming a relatively stable emulsion under the conditions and time period required for emulsion formation and moreover must be adjusted to the point where transformation of the rubber from an organic solvent solution into colliodal suspension in the aqueous phase may be easily accomplished. Emulsions that are not stable are characterized by two layers and will result in latices of uneven quality, with large globules of undispersed cement distributed more or less irregularly throughout the emulsion.

The essence of the present invention comprises the discovery of the critical effects of emulsification temperature upon the particle size of the latex eventually formed from such emulsions. It has been determined that if the temperature rises above about 66° C. during emulsification, then the emulsion is on the verge of becoming unstable. As mentioned above an unstable latex contains a portion of the cement in a degree of subdivision so large that when the solvent is stripped from this portion the resulting polymer cannot remain in colloidal suspension and consequently deposits on and coats the stripping, recovery, and centrifuging equipment. It has been observed that the onset of emulsion instablity is signaled by a precipitous rise in measured particle size. Increases of this nature are seen in FIGURE 1. Great care must be taken to keep below the break point of these curves in day to day commercial operation. On the other hand, economic considerations largely dictate that the temperature of the cement being emulsified be in the order of at least about 20° C. Since the cement utilized for this purpose is normally the product of a solution polymerization reaction (such as the solution polymerization of isoprene), the product from the polymerization zone has approximately the temperature utilized during polymerization.

It is recognizable that it is cheaper to utilize the cement at these exit temperatures for emulsification purposes rather than going to the expense of providing heat exchangers and heat exchange media for either cooling or heating the cement, if it is possible to produce a satisfactory latex eventually from cements having this above described exit temperature. Of course, cements can be prepared from previously polymerized elastomers by solution methods, but this is generally uneconomic or, if used, will usually entail the solution of the polymer in a warm solvent, again within the temperature range of at least about 29° C.

One of the peculiar features of the phenomenon on which the present invention is based lies in the response of the particle size of the latex eventually produced to the soap content of the aqueous phase as well as to other easily controlled process variables. This is true regardless of the exact emulsification temperature provided only that the temperature is not allowed to rise above the maximum temperature specified. It is preferred that the temperature be restricted to within the range from 32 to 65° C. and still more preferably between about 35 to 60° C., these more preferred ranges providing additional security that the average particle size of the eventual latex is within the desired range, that is, between about 0.5 and 0.7 micron, especially when the soap content of the concentrated latex is between about 1 and 2.5% by weight based on the aqueous phase.

The pressure of the emulsification unit should be adjusted to such a point that at the emulsification temperature employed, the suction pressure of the emulsification pump or its equivalent is higher than the vapor pressure of the cement solvent. For example, when utilizing pentanes as the cement solvent and a pump for the emulsification unit, a suction pressure between about 40 and 80 p.s.i.g. is preferred to provide an eventual latex particle size below about 0.7 micron.

*Solvent removal*

Following the emulsification of the elastomer cement within the critically defined temperature range, it is essential to remove substantially all of the cement solvent. This may be done by several means, the particular means being dependent upon the tendency of the specific elastomer to form a stable latex. If possible, simple flashing techniques are desirable, but in their absence it is necessary to devise a method which will not only cope with the foam usually formed but actually capitalize upon this phenomenon.

The foaming operation is accomplished by one of two alternatives or combinations thereof. The solvent for the polymer (hereinafter referred to as the rubber) is one having a solubility in water of no more than about 5 cc. per liter of water at 20° C. The rubber solvent may have any boiling point suitable for vaporization of the solvent below rubber degradation temperature, preferably below 150° C. Preferably, it has a boiling point (or boiling points if a mixture), lower than that of the boiling point of water under the same pressure conditions. In order for the foam operation to be accomplished to an optimum degree, it is preferred that the solvents have a boiling point of at least 40° C. below that of water. The reason for this will become appparent during the description of the foaming operation.

Foaming is accomplished by either heating the emulsion sufficiently to vaporize at least a substantial proportion of the rubber solvent without vaporizing more than a minor proportion of water or, on the other hand, the foaming may be accomplished by preheating and reducing pressure until foaming is accomplished. It is to be emphasized that the foaming operation is carried out with the end result of vaporizing the rubber solvent even though there is no substantial massive escape of the solvent from the foam. In other words, the foaming operation is not considered to be a fractional distillation or flashing in any sense. It is, on the contrary, the creation of gaseous bubbles throughout the heated or depressurized emulsion sufficient to cause the formation of a foam resembling whipped cream or froth, thus constituting extremely intimate mixtures of vaporized solvents, dispersed throughout the liquid phase, the liquid phase comprising the aqueous dispersion of colloidal rubber particles in a colloidal solution of the emulsifying agent.

The particular apparatus utilized for accomplishing this step does not form a part of this invention. Foaming is best accomplished by employing a heat exchanger tube bundle wherein the emulsion passes either inside or outside the tubes surrounded by a heat exchange medium of any desired description, or by employing direct steam addition to the emulsion in a suitable vessel.

The foam created by the above-described treatment then may be collapsed by cooling or by the application of sufficient pressure to cause condensation of the vaporized solvent. The condensed solvent forms a liquid phase which is separate from the aqueous phase now containing the elastomer in the form of a latex. The solvent may be removed by any desirable means, such as gravitational separation including centrifuging or merely decanting one phase from the other. Preferably, the condensed foam is passed through a coalescer to still further resolve the several phases.

*Latex concentration*

The latex derived as described above now comprises an excessively large aqueous emulsifier phase having polymer particles colloidally dispersed therein either with or without minor residual portions of solvent. A second decanting step may be accomplished after heating the latex sufficiently to promote further phase separation of any residual solvent although this step is not always essential. The latex can be concentrated by passing it through a centrifuge whereby a major proportion of the aqueous emulsifier phase is removed and separated from a concentrated latex phase which now may contain upwards of 50% by weight of colloidally dispersed hydrocarbon polymer (rubber) together with the remaining portion of the aqueous emulsifier phase. The conditions of centrifuging are controlled to accomplish the degree of separation desired and will depend in part upon the precise concentration of the several components referred to here as well as the toleration of the emulsification agent in the final latex and use. Still further solvent removal may be accomplished by passing the concentrated latex through flashing drums or strippers and optionally the latex may be subjected to a second or further centrifuging operation or operations to remove still further portions of the aqueous emulsifier phase referred to as "serum."

Concentrated latex

The solids content of the latex is of considerable importance when the latex is to be used for the preparation of dipped goods and vulcanized foam. When the latex is to be employed as an intermediate for the recovery of rubber by coagulation, the solids content and content of emulsifying agent are of decreasing importance. The required solids content of the concentrated latex will vary depending on such factors as the elastomer species, the species of the emulsifying agents and the ultimate utility. Generally, the solids content of the latex should be in excess of 50% by weight, preferably 55–75% by weight being specifically determined in each case. For cis-1,4-polyisoprene latex, it is most preferred that the solids content be in excess of about 60% and generally between 65 and 70%; for cis-1,4-polybutadiene the solids content may be considerably less and still be acceptable, but in no case should the solids content be below about 50% by weight, when the latex is to be used for the preparation of vulcanized foams or dipped goods.

In demonstrating the effect of emulsification temperature upon the eventual latex particle size, the following comparative experiments were performed and are presented graphically in FIGURE 1. For this purpose, a cement comprising 8 weight percent of polyisoprene having an intrinsic viscosity of 11 dl./gram dissolved in mixed pentanes was utilized. The emulsification pump was operated at 3500 r.p.m. The feed rate thereto was 2 g.p.m. of cement and 2 g.p.m. of soap solution, the soap being rosin acid potassium soaps dissolved in water. Four concentrations of soap solution were utilized, ranging from 1.0 to 2.1 weight percent based on the aqueous phase. It will be seen that the emulsification temperature had a drastic effect upon the eventual particle size, as shown in FIGURE 1. As long as the temperature of emulsification was restricted to less than about 68° C. the particle size remained responsive to other controlled conditions and in the particle size range which is considered to be satisfactory for the present purpose. If however, the temperature of emulsification exceeded this figure, then a sharp and almost vertical rise in latex particle size occurred.

The process of the invention will be described with particular reference to FIGURE 2. A cis-1,4-polyisoprene cement containing 10% by weight of polyisoprene, the solvent being mixed amylenes, is taken from a source 1 through line 2 to a blend and surge tank 3 wherein it is mixed with an approximately equal amount of water containing 1.5% by weight (basis water) of potassium rosinate, from a source 4 via line 5. The mixture from the blend tank 3 is then passed by means of line 6 and eductor 7 to an emulsification device 8 which is operated at an exit temperature of about 135° F. The emulsion is recycled by means of lines 9 and 10 to ensure maximum dispersal in the emulsification device. Preferably, the emulsified mixture is then passed to the holding tank 11 wherein a recycle of about 1–5% of the emulsified material is passed back into line 10. This proportion being recycled so as to insure complete emulsification of any minor amount of the emulsification mixture not previously fully emulsified.

The finished emulsion is then passed by means of line 12 to the heat exchange bundle 13 comprising the foam forming unit which is operated at about 170–200° F. under 15 p.s.ig. In this unit, the material which exits comprises a foam of shaving cream consistency which is passed to the time tank 14 for a residence period of less than about 1 minute in order to enable the solvent to reach its equilibrium concentration relative to the polymer throughout the foam. The product then proceeds to the foam condenser 15 wherein the foam is chilled to about 110° F. at 10 p.s.ig. thus causing a collapse of the foam due to condensation of the vaporized solvent to a liquid state. The condensed foam passes by means of line 16 through coalescer 17 which is packed with steel wool for the purpose of further resolving the separate phases of solvent and latex.

The coalesced and condensed material then passes by means of line 18 to a decanter 19 wherein it is stored for a sufficient time at about 110° F. and 10 p.s.i.g. to cause a substantial settling of the phases, the solvent rising to the top and being removed by means of line 20. The lower layer, comprising a concentrated emulsion comprising largely a latex with minor proportions of residual solvent is optionally passed by means of line 21 to centrifuge 22. Any serum comprising water and emulsifying agent removed thereby may be recycled by line 31 to the emulsification zone of the process.

The concentrated mixture now contains a minor but substantial amount of residual solvent which is preferably removed by subjecting it to foam formation and collapse as hereinbefore described, in units 23, 24, and 25 comprising the foam former 23, time tank 24 and foam condenser 25 and thereafter passed through a set of apparatus comprising the coalescer 26 and decanter 27. The purpose and results of each of these units are substantially identical with the corresponding pieces of apparatus described hereinbefore.

The bottom layer from the decanter 27 after removal of the top layer solvent comprises a latex containing a reduced but still substantial amount of solvent which is preferably removed at least in part by passage through a heater 28 to raise the temperature to about 180° F., the heated latex being then sent to a flash vessel 29 for final removal of solvent as vapor. The dilute latex is now sent by means of line 29A to a centrifuge 30 for still further removal of serum (water and emulsifying agent) which is recycled by means of line 31 to the serum tank 4.

The final product is a concentrated latex containing less than about 1% solvent based on the rubber and the product comprising about 65% colloidally dispersed rubber with 35% water containing about 0.35% by weight of potassium rosinate based on the water phase.

Turbidimetry is used to determine the latex particle size. Specifically the particle size analysis is carried out in two steps using a Beckman Model B spectrophotometer.

Step 1 involves dilution of the latex to be characterized in a 1 cm. cell to yield exactly 50% transmission of light at a wave length of 375 m$\mu$. After making this manipulation, the optical density at a wave length of 550 m$\mu$ is determined. This optical density value is then converted to a particle size number using a graph. On this straight-line graph, an optical density at 550 m$\mu$ of 0.14 corresponds to a relative diameter of 0.2$\mu$, while an optical density of 0.5 corresponds to a relative diameter of 1.0$\mu$.

We claim as our invention:

1. In the process for the preparation of an elastomer latex, wherein a cement of the elastomer in a $C_{4-6}$ hydrocarbon solvent, said cement having a temperature of about 25–70° C., is emulsified with 0.5–2 parts by volume, per part of cement of an aqueous solution of potassium soaps of carboxylic acids whereby a cement in water emulsion is formed, and thereafter vaporizing and removing the hydrocarbon solvent to form the latex, the improvement comprising maintaining an average temperature of the emulsion components during emulsification of 35–60° C., substantially none of the cement solvent being vaporized during emulsification and converting the emulsion to a foam by vaporizing the hydrocarbon solvent to create gaseous bubbles thereof throughout the emulsion, collapsing the foam to form a liquified hydrocarbon phase and a latex phase and separating the liquified hydrocarbon phase from the latex phase.

2. A process according to claim 1 wherein the elastomer is a conjugated diene rubber.

3. A process according to claim 1 wherein the elastomer is polyisoprene and the hydrocarbon solvent is a hydrocarbon having five carbon atoms per molecule.

4. A process according to claim 1 wherein the emulsification is carried out in an emulsification pump the suction pressure of which is greater than the vapor pressure of the hydrocarbon at the emulsification temperature.

References Cited by the Examiner
UNITED STATES PATENTS

| | | | |
|---|---|---|---|
| 2,313,144 | 3/1943 | Gomm | 260—29.6 |
| 2,444,801 | 7/1948 | Arundale | 260—29.7 |
| 2,799,662 | 7/1957 | Ernst et al. | 260—29.7 |
| 3,003,930 | 10/1961 | Pugh et al. | 202—46 |

FOREIGN PATENTS

| | | |
|---|---|---|
| 847,525 | 9/1960 | Great Britain. |

MURRAY TILLMAN, *Primary Examiner.*

SAMUEL H. BLECH, LOUISE P. QUAST, *Examiners.*

J. ZIEGLER, *Assistant Examiner.*